(12) United States Patent
Garg et al.

(10) Patent No.: US 6,625,603 B1
(45) Date of Patent: Sep. 23, 2003

(54) OBJECT TYPE SPECIFIC ACCESS CONTROL

(75) Inventors: Praerit Garg, Kirkland, WA (US); Michael M. Swift, Seattle, WA (US); Clifford P. Van Dyke, Bellevue, WA (US); Richard B. Ward, Redmond, WA (US); Peter T. Brundrett, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,768

(22) Filed: Sep. 21, 1998

(51) Int. Cl.7 .............................................. G06F 17/00
(52) U.S. Cl. ..................... 707/9; 707/103 R; 707/201; 709/319; 709/320
(58) Field of Search ............... 707/1–206; 709/310–332

(56) References Cited

U.S. PATENT DOCUMENTS

| | | | |
|---|---|---|---|
| 5,291,593 A | * 3/1994 | Abraham et al. | 707/200 |
| 5,724,575 A | * 3/1998 | Hoover et al. | 707/10 |
| 5,787,427 A | * 7/1998 | Benantar et al. | 707/9 |

OTHER PUBLICATIONS

Deng, Fast control in object oriented repetitive access, Security Technology, 1994, Proceedings, IEEE 28th Annual International Carnahan Conference on, Oct. 12–14, 1994, pp. 173–175.*

Han et al., Prefetching based on the type–level access pattern in object–relational DBMS's, Data Engineering 2001, Proceedings, 17th International Conference on, 2001, pp. 651–660.*

Kao et al., An extended capability architecture to enforce dynamic access control policies, Computer Security Applications Conference, 1996, 12th Annual, Dec. 9–13, 1996, pp. 148–157.*

Hays et al., "The Object Filter and Access Control Framework", Florida Atlantic University, PLoP 2000 Conference, pp. 1–15.*

Rosenthal et al., "A Fine–grained Access Control Model for Object–oriented DBMSs", The MITRE Corporation, 1995 IFIP Transactions: Database Security VIII.*

* cited by examiner

Primary Examiner—David Jung
(74) Attorney, Agent, or Firm—Lee & Hayes, PLLC

(57) ABSTRACT

Providing object type specific access control to an object is described. In one embodiment, a computer system comprises an operating system operative to control an application and a service running on a computer. The service maintains a service object having a link to an access control entry. The access control entry contains an access right to perform an operation on an object type. The system further includes an access control module within the operating system. The access control module includes an access control interface and operates to grant or deny the access right to perform the operation on the object.

20 Claims, 5 Drawing Sheets

OBJECT TYPE SPECIFIC ACCESS CONTROL

RELATED APPLICATIONS

This application is related to the following applications, all of which were filed on Sep. 21, 1998, and assigned to the same assignee as the present application:

"Per-Property Access Control Mechanism", Ser. No. 09/157,771, and

"Extensible Access Control Rights Mechanism", Ser. No. 09/157,882.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright©1998, Microsoft Corporation, All Rights Reserved.

1. Field

This invention relates generally to software access control, and more particularly to providing access control on an object type basis.

2. Background

Multi-user computer systems and systems connected to a multi-user network of computers require the ability to control and restrict access to various components and services provided within the computer system. Windows NT® is an operating system available from Microsoft Corporation, Redmond Washington, and is an example of a multi-user system implementing access control. Several reasons exist for providing access control, however primary reasons are to protect the privacy of each user's data, and to protect system data from intentional or inadvertent corruption causing system failure or inefficient operation.

Examples of the components typically requiring an access control mechanism include file systems, electronic mail (E-mail) services, directory services, and database systems. Each of these components is generally represented by objects having a plurality of properties describing various aspects of the object. Generally, the objects can be divided into two categories, container objects and non-container objects. Non-container objects are objects that are atomic, that is, they cannot contain other objects. Container objects are objects that can contain other objects, including other container objects. An example of a container object is a folder object in a file system manager. A folder, as is known in the art, can contain files and sub-folders. Thus, a folder object is a container object, since it can contain other objects (file objects and folder objects). A file cannot contain other files or sub-folders, therefore the file object is a non-container object.

Another example is a directory service. Directory services maintain a database of objects describing various resources available on the computer system. The Active Directory™ system available from Microsoft Corporation, Redmond Wash. provides such a service. Directory services typically need to maintain a wide variety of objects to represent the various types of resources available on modern computer systems. These objects include both container objects and non-container objects. Examples of entities represented by non-container objects include system users, computers, printers and the like. Examples of entities represented by container objects include organizational units, domains and groups. The object types mentioned are meant to be representative of the many types of objects maintained by a directory service, and do not necessarily include all the object types defined by a service.

It is important to provide access control for directory objects because the objects are used to define critical features of complicated systems. The intentional or accidental creation or deletion of an object can have serious effects. For example, deleting an object representing a computer hosting a mission critical database system could cause applications relying on the database to fail. Thus, an important aspect of access control systems is the ability to restrict access to objects to those users responsible for insuring that the object and object structure is correct.

Typically, there are several major concepts common to access control systems provided by prior systems. The first concept is that users of the system are assigned a user identifier (USERID). The USERID uniquely identifies a user to the system. The USERID is used to control and track access to the various components of the computer system. The USERID is generally associated with a password, which must be correctly supplied before a user is allowed access to the system.

In addition to the USERID, some operating systems, including Windows NT®, also support the concept of a group identifier (GROUPID). A group identifier allows the system to treat a related group of users in a similar way. For example, there may be a group of users assigned to a backup group whose function is to provide daily backups of the data contained within the computer system. Since the members of this group would all need similar system privileges, it is easier and more convenient to include them in a user group and assign the privileges to the group, rather than to each individual within the group.

The second concept supported by access control systems is the concept of access rights associated with an object. Access rights define who is allowed to perform particular operations on an object and are typically granted or denied based on the USERID or GROUPID associated with an application making a service request. In the context of a file system, access rights associated with files include the right to create a file, read a file, write a file, update a file, and delete a file. In the context of a directory service, access rights associated with directory entries include the right to create an entry, read an entry, update an entry, and delete an entry.

Prior systems have used bit masks to represent permissions (also referred to as access rights or access control rights) associated with an object. In this scheme, each bit in the bit mask represent one of a plurality of different permissions. In one system, Windows NT® version 4.X, the bit mask is 32 bits wide.

A critical problem with using bit masks to define access control rights is that the number of rights that can be defined in the system is bound by the number of bits in the bit mask. In the above example, a maximum of 32 different rights are available. This limitation becomes more critical as the number of different types of objects increase. Associating a create and delete right for each object type defined in a system using only a bit mask will quickly exhaust the number of bits in the bit mask. Additional memory could be added to the data structure to increase the size of the bit mask, however this raises compatibility problems between applications designed for the old and new bit mask sizes.

Therefore, there is a need in the art for an access control system that provides a mechanism for defining access control rights for specific object types that allows for a large number of differing object types. The data structures used to support the access control should not need modification as the number of object types increases. In addition, the system should be implemented by a central module within the operating system in order to provide a consistent, non-redundant interface.

SUMMARY

The above-identified problems, shortcomings and disadvantages with the prior art, as well as other problems, shortcoming and disadvantages, are solved by the present invention, which will be understood by reading and studying the specification and the drawings. In one configuration, the system includes an operating system operative to control an application and a service running on a computer. The service maintains a service object having a link to an access control entry (ACE). The access control entry contains an access right to perform an operation on an object type. The system further includes an access control module within the operating system. The access control module includes an access control interface and operates to grant or deny the access right to perform the operation on the object.

One aspect of the invention is that access rights are interpreted with respect to a particular object type identifier. Different object types can have different access rights, allowing for a large number of possible object type and object access right combinations.

One of the data structures defined in the invention includes fields defining whether access is begin granted or denied, and the type of access to grant or deny. The data structure also defines the user or group to whom the permission is granted or denied. Finally, the data structure includes an identifier used to indicate the object type to which the permissions apply.

One of the data structures defined in the invention includes fields defining whether access is being granted or denied, and the type of access to grant or deny. The data structure also defines the user or group to whom the permission is granted or denied. Finally, the data structure includes an identifier used to indicate the object type to which the permissions apply.

A second data structure defined in the invention allows groups of related objects to be included in a set. The data structure is implemented as a graph structure, with the root of the graph identifying a container object type. Lower level nodes in the graph describe sets of related child object types that may be created, deleted or listed from the container object.

The invention includes systems, methods, computers, and computer-readable media of varying scope. Besides the embodiments, advantages and aspects of the invention described herein, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
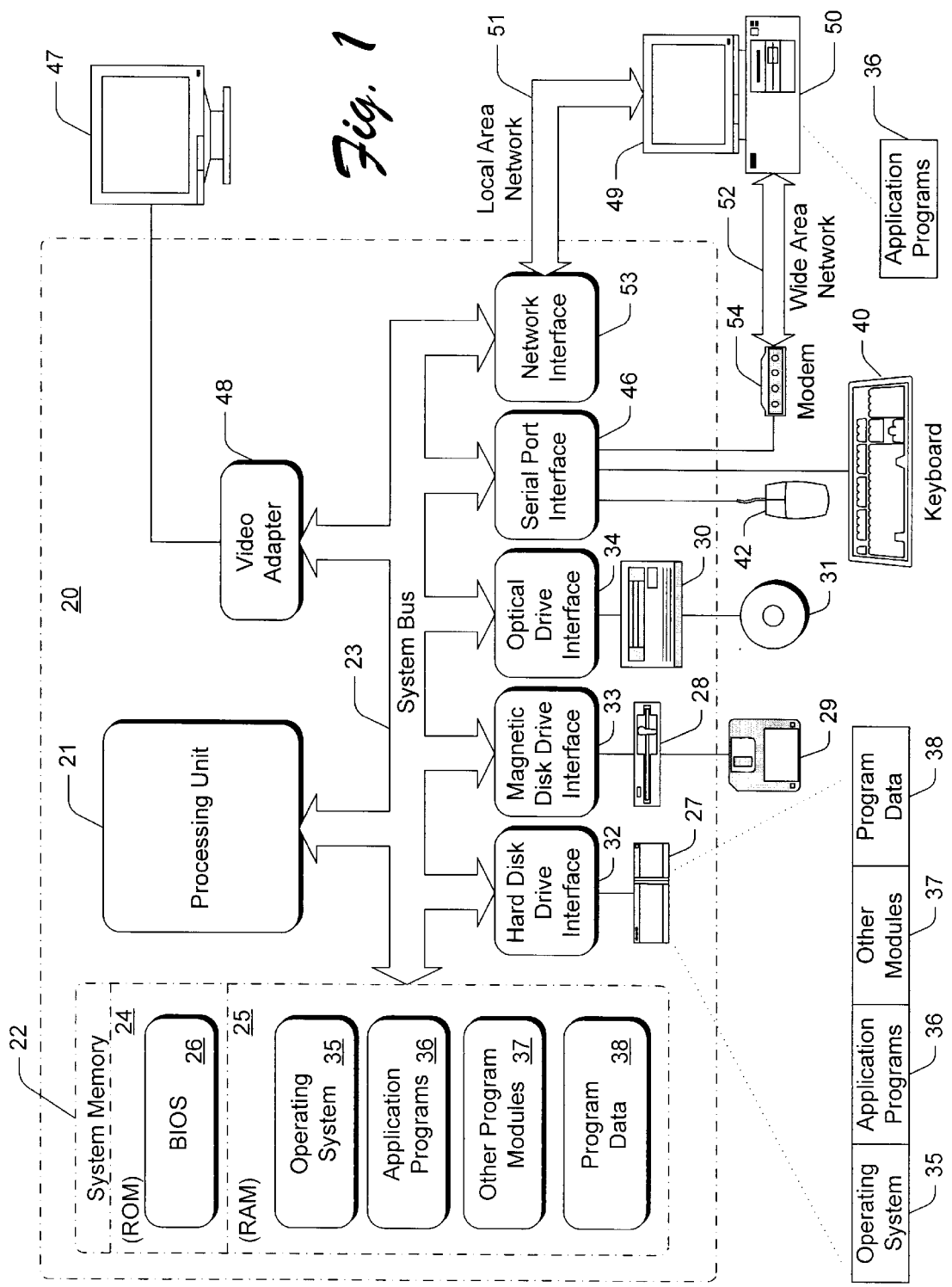
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples the various system components, including system memory 22 to processing unit 21. There can be one or more of processing unit 21, such that computer 20 has a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

In this section of the detailed description, a description of a computerized system according to an embodiment of the invention is provided. The description is provided by reference to FIG. 2 which shows a block diagram of various major components of a system of the invention, and FIGS. 3(a), 3(b) and 3(c) which show details of data structures used by the system. The detailed description of the system presented in this section concludes with a description of how the components and data structures operate together to provide object type specific access control rights.

Figure 2:
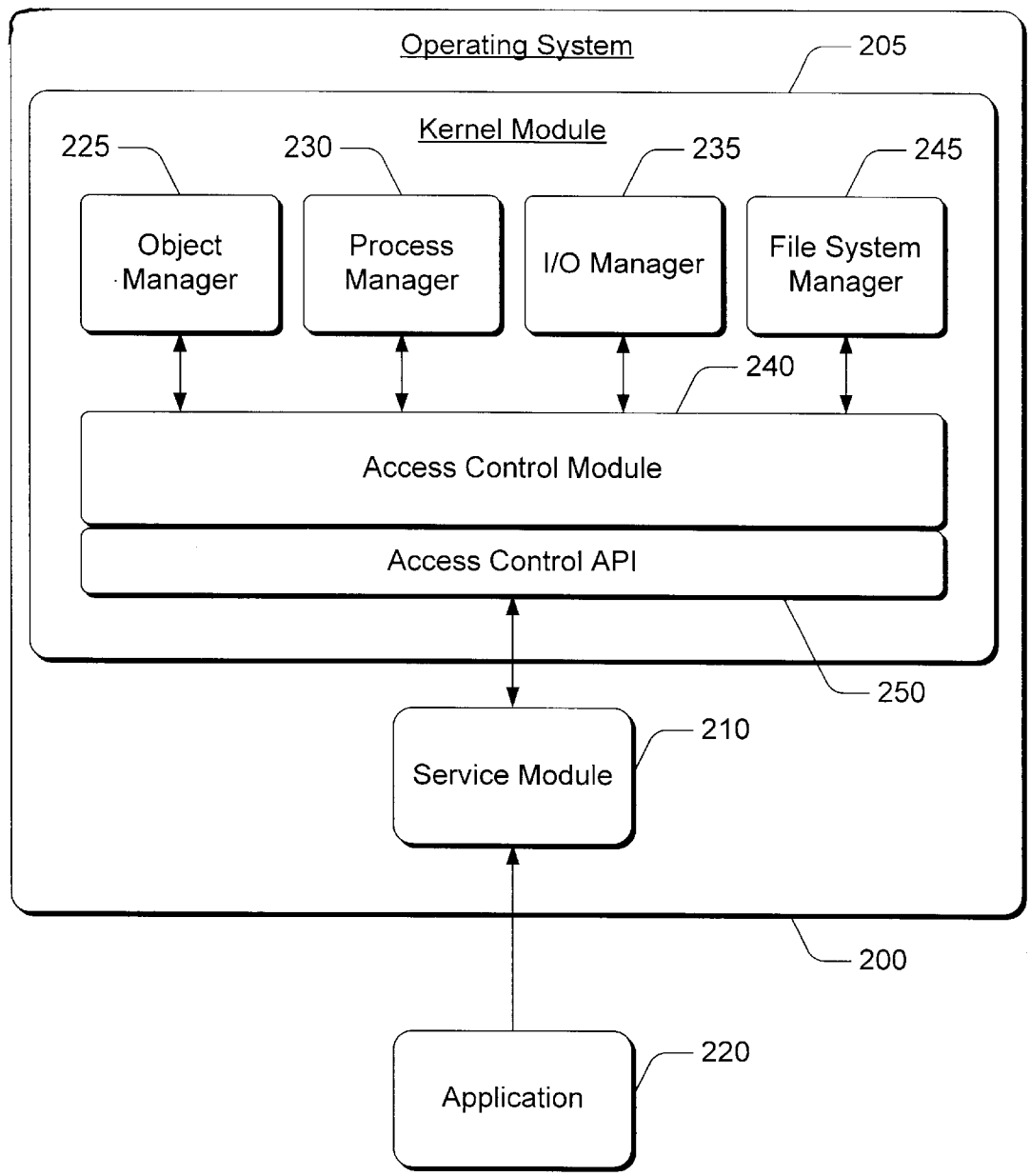
FIG. 2 shows a block diagram of a system according to one embodiment of the invention.

In FIG. 2, a system according to an embodiment of the invention includes an operating system 200 and application 220. As shown, the operating system 200 includes a kernel module 205 and a service module 210. Those skilled in the art will recognize that other components of operating systems exist. Only those components necessary to provide an enabling description of the invention have been provided.

Kernel module 205 provides the core components of operating system 200. Included in kernel module 205 are an object manager 225, a process manager 230, an input/output (IO) manager 235, a file system manager 245, and an access control module 240. These core components provide the basic services required to control the execution of various applications like application 220, and also to manage the devices attached to the computer system. Because of the specialized processing performed by the kernel and its modules, it is desirable for the kernel components to run at a higher priority and in a protected memory area. Those of ordinary skill within the art will appreciate that the operating system 200 also may include other components, not shown in FIG. 2; only those parts necessary to describe the invention in an enabling manner are provided.

Object manager 225 maintains and manages objects defined within the system. Objects have properties that are typically used to describe various aspects of the components of the system. Many different types of objects may exist in the system, and, in one embodiment of the invention, each object is assigned two unique identifiers known as a Globally Unique Identifier (GUID) to distinguish it from the other objects. GUIDs are 128 bit numbers and are guaranteed not to be re-used by another application. The first identifier is the Object Type GUID, which identifies the particular type of object being managed by the object manager. The second identifier is the Object GUID, which uniquely identifies the particular object within a group of objects of the same type.

Process manager 230 controls the execution of processes within the system. A process is typically thought of as an instance of an executable computer program. A process typically has a priority assigned to it, and may require resources from several components of the operating system. In addition, processes typically have the USERID and GROUPIDs of the user invoking the process associated with them. Process manager 230 controls the execution of the potentially many different processes competing for system resources and processing time.

IO manager 235 controls input and output to the various devices connected to the computer system. These devices include disk drives (both fixed and removable), network interfaces, communications interfaces (both serial and parallel), and display devices.

File system manager 245 maintains and coordinates access to the file system. The file system manager arbitrates access to files by processes, and maintains the data structures describing the structure and organization of the files and folders comprising the file system.

Access control module 240 provides a centralized, standard mechanism to evaluate whether or not various requests for operations affecting objects should be granted or denied. In one embodiment of the invention, access control module 240 is known as a "Security Reference Monitor" and is a kernel module of the Windows NT® operating system. The access control module defines an access check application programming interface (API) 250 for various components to submit access check requests, and to communicate results back to the requester. Access control module 240 applies the method described in the next section of the detailed specification to the data structures described below in reference to FIGS. 3(a), 3(b), and 3(c) to evaluate the requests.

Service module 210 is a process or thread that provides one of a variety of services to various applications running on the system. In one embodiment of the invention, service module 210 is a directory service. In an alternative embodiment of the invention, service module 210 is a database engine. Those of ordinary skill in the art will recognize that other service modules exist on various operating systems and can be adapted to the system of the invention.

Application 220 in the block diagram represents a typical application running under the control of the process manager 230 of operating system 200. Typically, application 220 requires the services of the object manager 225, the file system manager 245, and various service modules 210 during its execution.

The various components described above have been shown and described as residing on a single computer system, however, the invention is not so limited. For example, the directory service could reside on a separate computer system from the application using the directory service, with the two systems communicatively connected by a network. The same is true for other components of the system, as those of ordinary skill in the art will recognize.

Figures 3A, 3B:
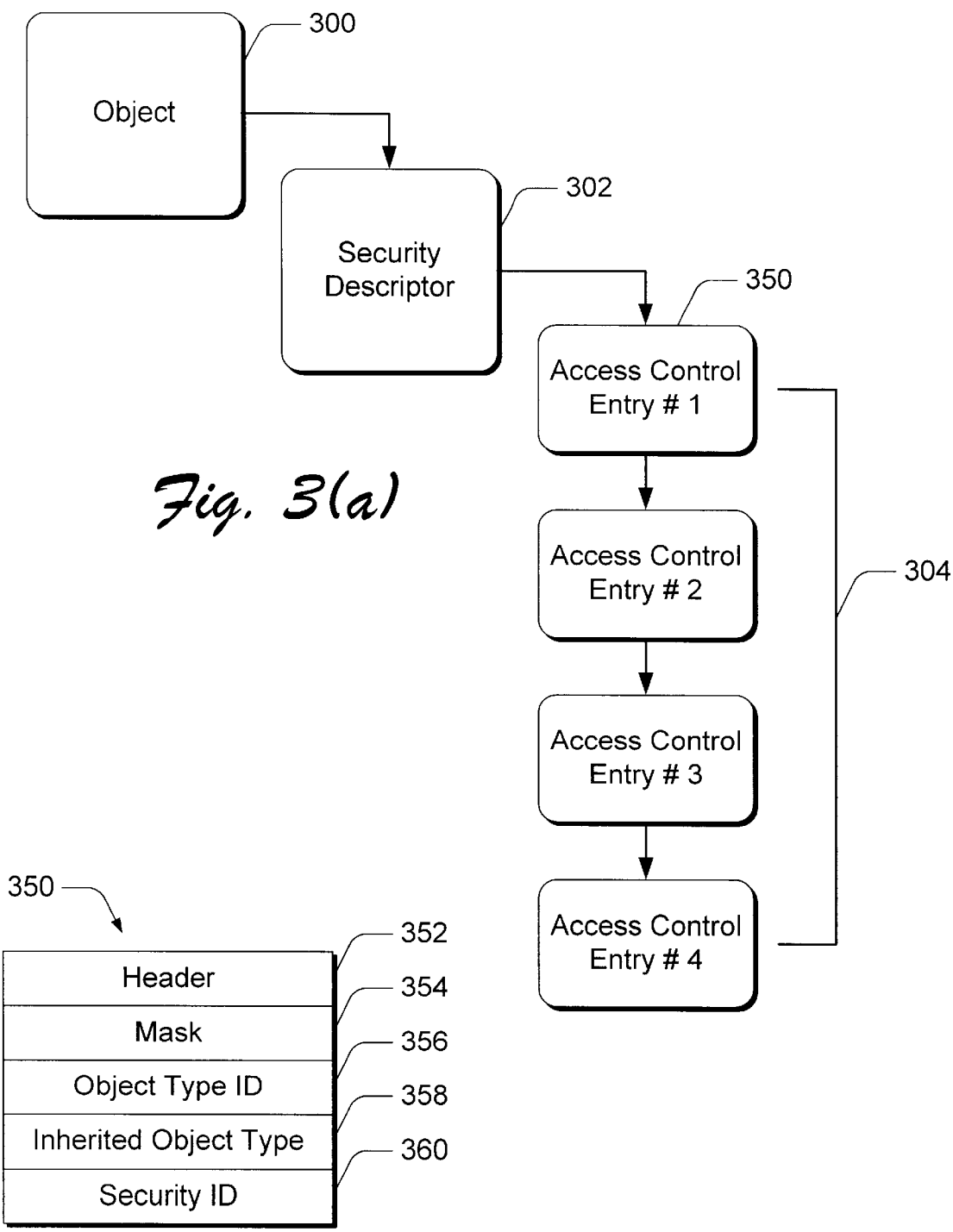
FIGS. 3(*a*), 3(*b*) and 3(*c*) show data structures used within a system according to one embodiment of the invention.

A description of the data structures used within a system of the invention will now be presented. FIG. 3(a) provides a graphical description of the relationships between the various major data structures used by the system, including object 300, security descriptor 302 and access control entries 304.

In one embodiment of the invention, object 300 is a data structure describing an object managed by service provider module 210. In an alternative embodiment of the invention, object 300 is managed by the operating system object manager 225. Object 300 can be any one of a number of different object types supported by the operating system and services running under the operating system. Object 300 comprises various properties, some of which are common to all objects, and others which are application or service specific. The common properties include an object type identifier, an object identifier, and a reference to a security descriptor 302. In one embodiment of the invention, the identifiers are Globally Unique Identifiers (GUIDs). Application or service specific properties vary depending on the application's or service's purpose and function. For example, an object defined by the file system service can include properties such as the USERID of the owner of the file, the file creation time, the file modification time, the file access time, and data stream descriptors. Alternatively, a "user" object defined by a directory service can include the user's name, E-mail address, office telephone number, office location, and password.

Security descriptor 302 provides details of the security and access control applicable to object 300. Security descriptor 302 contains various properties, including the owner security identifier and an access control list (ACL) 304 of access control entries 350. The owner security identifier indicates who "owns" the object, i.e., who is responsible for maintaining the object. Typically, the owner security identifier is the USERID of the person running an application that created the object. The access control list 304 contains zero or more access control entries 350, which define the access control applied to the object 300. Each entry in the list defines a set of permissions to be applied to a particular USERID or GROUPID with respect to an object type identified in the access control entry 350. Desirably, the order of entries in the access control list 304 is significant, with entries appearing first in the list taking precedence over conflicting entries, if any, appearing later in the list. For example, if an entry granting create permissions for a particular object type appears before an entry denying create permissions to the same object type, the permissions will be granted.

The access control entry (ACE) 350 referred to above is the basic building block used to provide access control to various objects. In FIG. 3(b), a detailed view of an access control entry 350 is presented. In one embodiment of the invention, access control entry 350 comprises header 352, mask 354, object type identifier 356, inherited object type 358, and security id 360.

Header 352 defines the type of access control entry. The value in header 352 indicates whether the entry will grant permissions or deny permissions. In addition, this value contains flags that are used to indicate how the access control entry will be inherited to the objects in the container on which it is specified. In one embodiment of the invention, there are four flags that indicate how a newly created child object will inherit access control entries: OBJECT_INHERIT, CONTAINER_INHERIT, NO_PROPOGATE_INHERIT, and INHERIT_ONLY.

OBJECT_INHERIT when set, indicates that the ACE is part of the non-container inherit ACL.

CONTAINER_INHERIT when set, indicates that the ACE is part of the container inherit ACL.

NO_PROPAGATE_INHERIT when set, indicates that inheritance control flags should not be propagated to ACEs inherited by sub-containers, so that the associated ACEs do not propagate further.

INHERIT_ONLY when set, indicates that the ACE should not be interpreted as part of the ACL for the container object. In other words, if this flag is not set, then ACE is part of the ACL for the container. This flag is useful to provide for setting permissions inheritable by sub-objects but do not affect accessibility of the container itself. For example, if an ACE is intended to be inherited by files in a folder, there is a good chance that it should not be enforced for access to the folder itself.

NO_PROPAGATE_INHERIT and INHERIT_ONLY flags are meaningful only if at least one of the other two flags (CONTAINER_INHERIT, OBJECT_INHERIT) are present. This is because those two flags add behavior to an inheritable ACE but do not define the type of inheritance.

The above-described flags define three categories for an ACE. The first category is Effective ACE. ACEs in this category apply to the container itself. The second category is Container Inherit ACE. ACEs in this category are inherited by sub-containers created in the container. The third category is Non-container Inherit ACE. ACEs in this category are inherited by non-containers created in the container.

In an embodiment of the invention, the following table controls how a newly created object will inherit ACEs from parent container objects:

TABLE 1

| Flags in Parent Container | Inheritance to subcontainer | Inheritance to sub-object |
|---|---|---|
| No flags | Not inherited - since no inheritance is specified, the ACE is not inherited. | Not Inherited - since no inheritance is specified, the ACE is not inherited. |
| OBJECT_INHERIT - implies that the ACE is effective on the parent container and gets inherited to sub-objects but not sub-containers | INHERIT_ONLY - implies that the ACE is not effective here as per the definition on the parent. OBJECT_INHERIT - implies that ACE will be further inherited by sub-objects under the sub-containers. | Inherited with no flags - implies that the ACE got inherited as an effective ACE. Since this is not a container, inheritance flags are meaningless anyway. |
| CONTAINER_INHERIT - implies that the ACE is effective at the parent container and should be inherited to sub-containers but not non-containers. | CONTAINER_INHERIT - implies that the ACE is inherited as an effective ACE on the subcontainer and will get inherited further to sub-sub-containers. | Not Inherited - implies ACE does not get propagated to a non-containers as per the definition. |
| OBJECT_INHERIT, CONTAINER_INHERIT - implies that ACE is effective at the parent container and should be inherited to all sub-objects (containers and non-containers) | OBJECT_INHERIT, CONTAINER_INHERIT - implies that the ACE is effective at the sub-container and will be propagated further to all sub-objects. | Inherited with No flags - implies that the ACE is effective. No flags are needed as there are no sub-objects. |
| INHERIT_ONLY, OBJECT_INHERIT - implies that the ACE is not effective at the parent container but it should be inherited by all non-container sub-objects. | INHERIT_ONLY, OBJECT_INHERIT - implies that the ACE is inherited but is not effective. It is inherited just for propagating to non-container objects below this sub-container | Inherited with no flags - the ACE has been inherited and is effective as per definition. |
| INHERIT_ONLY, CONTAINER_INHERIT - implies that the ACE is not effective at the parent but should be inherited to all sub-containers | CONTAINER_INHERIT - implies that the ACE has been inherited to the sub-container as effective ACE and will also propagate to sub-containers below. | Not Inherited - the ACE is not inherited as per the definition. |
| INHERIT_ONLY, OBJECT_INHERIT, CONTAINER_INHERIT - the ACE is not effective at the parent container but will be inherited to all sub-containers and non-containers. | OBJECT_INHERIT, CONTAINER_INHERIT - implies that the ACE is inherited as effective ACE and will further propagate to all sub-sub-containers and non-containers within this container | Inherited with no flags - implies that the ACE is inherited as effective ACE. No inherit flags are needed as no further inheritance will happen. |
| NO_PROPAGATE_INHERIT, OBJECT_INHERIT - defines that the ACE should be inherited to objects (non-containers) within the container but not propagated further | Not inherited - as per definition, the ACE is not inherited to the sub-container because it is not to be effective at sub-containers and does not need to get propagated any further. | Inherited with no flags - as per definition, the ACE is inherited to objects within the container as an effective ACE. |
| NO_PROPAGATE_INHERIT, CONTAINER_INHERIT - | Inherited with no flags - as per definition, the ACE is | Not Inherited - as per definition, it is not |

TABLE 1-continued

| Flags in Parent Container | Inheritance to subcontainer | Inheritance to sub-object |
| --- | --- | --- |
| implies that the ACE should be inherited by sub-containers within this container but not propagate any further | inherited as an effective ACE but with no inherit flags as there is no further inheritance needed. | inherited because it only applies to sub-containers. |
| NO_PROPAGATE_INHERIT, OBJECT_INHERIT, CONTAINER_INHERIT | Inherited with no flags - as per definition, the ACE is inherited as an effective ACE but with no inherit flags as there is no further inheritance needed. | Inherited with no flags - as per definition, the ACE is inherited as an effective ACE. |
| NO_PROPAGATE_INHERIT, INHERIT_ONLY, OBJECT_INHERIT - implies that the ACE is not effective at the parent container but should be inherited to all non-containers within the parent container but not propagated beyond. | Not inherited - as per definition, the ACE is not inherited as it is not effective and does not need to be propagated further | Inherited with no flags - as per definition, the ACE is inherited as effective ACE on non-containers within the parent container. |
| NO_PROPAGATE_INHERIT, INHERIT_ONLY, CONTAINER_INHERIT - implies that the ACE is not effective at the parent container but should be effective at the sub-containers within the parent container but should not be inherited any further | Inherited with no flags - as per definition, the ACE is inherited as effective ACE on containers within the parent container but without inherit flags as it is not to be propagated any further | Not inherited - as the ACE is only to be inherited to sub-containers. |
| NO_PROPAGATE_INHERIT, INHERIT_ONLY, OBJECT_INHERIT, CONTAINER_INHERIT - implies that the ACE is not effective at the parent container but should be inherited to all sub-containers and non-containers within the parent container. It should however not be propagated any further. | Inherited with no flags - as per definition, the ACE is inherited as effective ACE but without inherit flags as it does not need to be propagated any further. | Inherited with no flags - as per definition, the ACE is inherited as an effective ACE. |

Object type identifier 356 identifies an object type having an access control relationship to object 300, and also defines how the permissions in the bit mask are to be applied.

Mask 354 is a bit mask, with each bit defining a particular permission to be granted or denied as indicated by header 352. In one embodiment of the invention, mask 354 is a bit mask comprising 32 bits of which 16 bits are reserved for operating system permissions, and the remaining 16 bits are used to define object type specific permissions. The interpretation of the object type specific bits in mask 354 may vary according to the object type identifier 356.

In one embodiment of the invention, object type identifier 356 indicates one of a plurality of directory service objects. In this embodiment, the object type specific bits in mask 354 include bits to define the access rights in the following table:

TABLE 2

| Permission | Meaning |
| --- | --- |
| Create Child | Create a child object under object 300 having a type identified by object type identifier 356. |
| Delete Child | Delete a child object under object 300 having a type identified by object type identifier 356. |

In a further embodiment of the invention, object type identifier 356 indicates a file object or folder object. In this embodiment, the object type specific bits in mask 354 include bits to the define access rights in the following table:

TABLE 3

| Permission | Meaning |
| --- | --- |
| Create | Create a object under container object 300 having a type identified by object type identifier 356 which may be a file object or folder object |
| Delete | Delete an object under container object 300 having a type identified by object type identifier 356 which may be a file or folder object. |

The permissions presented in tables 1 and 2 are meant to be illustrative, and those skilled in the art will recognize that many other permissions could be applied to object types.

Inherited object type identifier 358 controls which object types the access control entry will get propagated to if the access control entry is specified to be inheritable in the access control entry header. Inherited object type identifier 358 in the access control entry is used to provide delegation of control on specific types of objects. If the identifier is specified in an access control entry on the container's access control list, then the corresponding access control entry is only propagated to and effective for objects of that type under the container.

Security identifier 360 contains a value identifying either a USERID or GROUPID to whom the permissions apply. If the value is a USERID, then the permissions defined in mask 354 for the object type defined in object type identifier 356 apply to that specific USERID. If the value is a GROUPID, then the privileges apply to each USERID that is a member of the group defined by the GROUPID.

In one embodiment of the invention, it is desirable to provide the ability to group object types into sets of objects with common access control permissions. For example, a directory service may define a "security principle" object set containing "user", "group" and "computer" object types. An access control entry that grants Create permissions on the "security principle" set to a USERID would allow an application running under the identity of USERID to create user, group and computer objects in the container because the object type set includes them all. A data structure to organize objects into related sets is provided in FIG. 3(c).

Figure 3C:
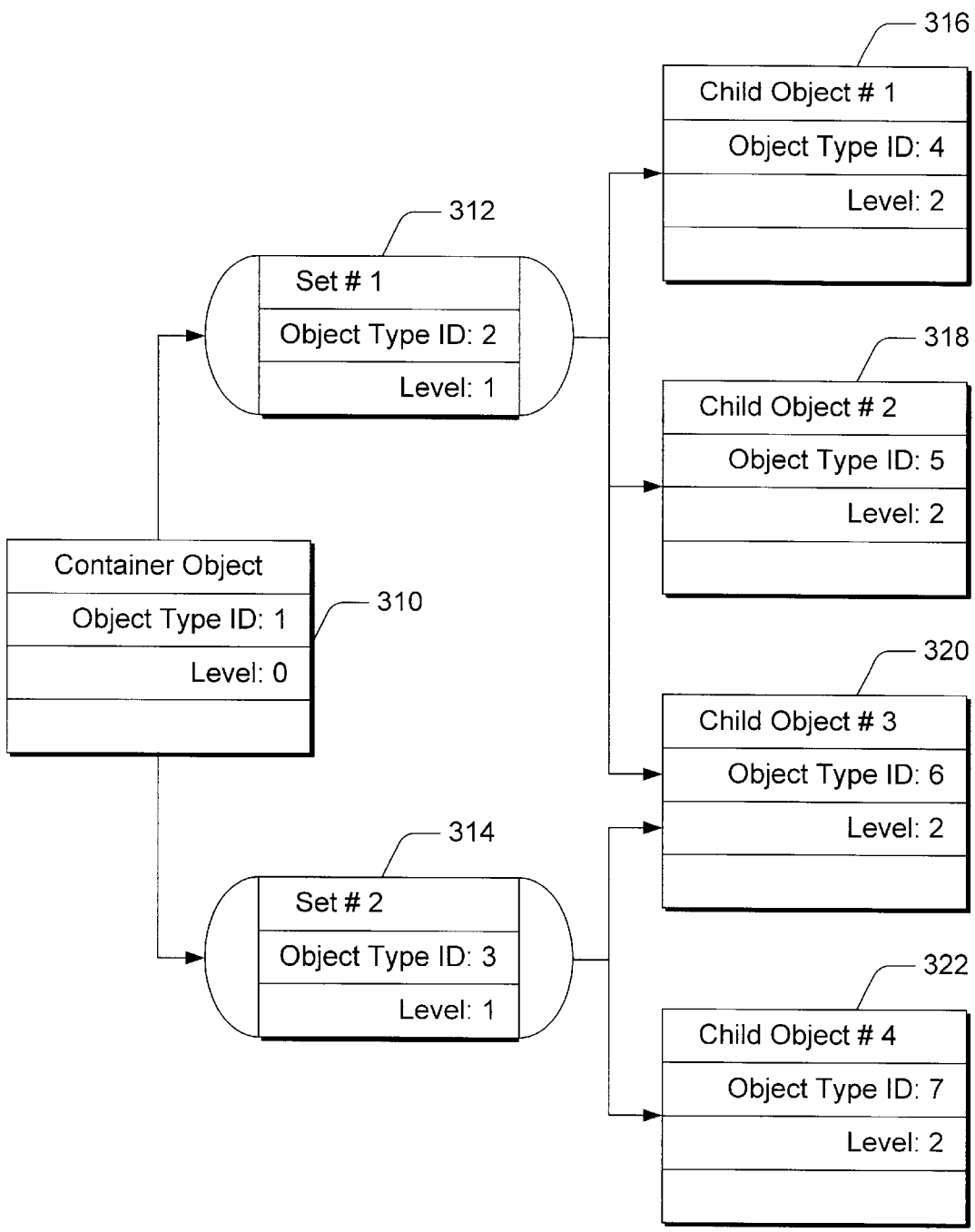

The data structure used to provide the ability to group object types into related sets is the directed graph, an example of which is shown in FIG. 3(c). The root node 310 of the graph represents a container, and contains an object type identifier and a list of sets associated with the container. In this example, two sets of related objects are present, sets 312 and 314. Sets 312 and 314 contain a unique identifier, which in one embodiment of the invention is a GUID. In addition, sets 312 and 314 each maintain a list of the objects in the set. In this example, set 312 comprises objects 316, 318, and 320 while set 314 comprises objects 320 and 322. In addition to object entries, the set may also contain entries referring to other sets, thereby providing for multiple levels in the graph.

In one embodiment of the invention, a node in the graph is represented by a data structure including three elements. The structure is represented by the following C/C++ structure definition:

```
struct {
    USHORT Level;
    USHORT Sbz;
    GUID *ObjectType;
}
``` where:

Level indicates the level in the graph. In one embodiment, a value of zero indicates the root of the graph, a value of one indicates the first level below the root, and a value of two indicates the second level below the root;

Sbz is reserved for future expansion; and

ObjectType is a pointer to a GUID identifying the object or set comprising the node in the graph.

In one embodiment of the invention, an object type may be a member of only one set, with the results that the data structure described above creates what is known in the art as a tree. However, the invention is not so limited, and in alternative embodiments, object types can be members of a plurality of sets, as shown in FIG. 3(c) where child object 320 is in both set 312 and 314.

Also, in an alternative embodiment of the invention, it is desirable to limit the depth of the graph to four levels, where a level includes the root container object, any sets defined under the container object, and any child object that is part of a set or contained by the container object. For example, the graph shown in FIG. 3(c) defines a graph having 3 levels. The root object is at the first level (level 0), the sets are at the second level (level 1), and the child objects are in the third level (level 2). Limiting the number of levels provides for efficient use of memory and processing resources.

Thus, in accordance with one embodiment of the invention, the system of FIG. 2 operates as follows. Application 220 issues a request to service provider module 210. The request can be any one of a number of operations, including a request to create a child object of a container object defined and managed by service module 210. Before performing the requested operation, service module 210 issues a call to access control module 240 using a function defined by access control API 250. In one embodiment of the invention, the function receives as parameters an access token, a security descriptor, an object graph, and a desired access indicator. The access token identifies the USERID and any GROUPIDs that the user identified by USERID is a member of. The security descriptor parameter is the security descriptor for the object, and the object graph is a graph as described with reference to FIG. 3(c) indicating the set groupings of objects. The desired access indicates what type of access (e.g. create child, delete child, delete tree) is desired.

The access control module 240 then examines each entry in the access control list provided by the security descriptor to determine if the desired access should be granted on each of the object types in the object graph. Details of the specific method used to determine if the desired access should be granted will be provided below in the Method section of the application. The API then returns an indication of the success or failure of the function call. Success indicates that the desired access was granted for each of the objects in the graph. Failure indicates that the desired access was not granted to any entries in the object graph or explicitly denied to one or more entries in the object graph. In one embodiment of the invention, two lists are also returned. The first list contains an entry corresponding to each entry in the object list and indicates which of the desired access rights indicated in the desired access parameter were granted. The second list provides a list of object types on which the corresponding access rights were granted.

Method

In this section of the detailed description, a method according to an embodiment of the invention is presented. This description is provided in reference to FIG. 4. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a computer from a medium therefrom to provide access control to various objects defined within an operating system.

Figure 4:
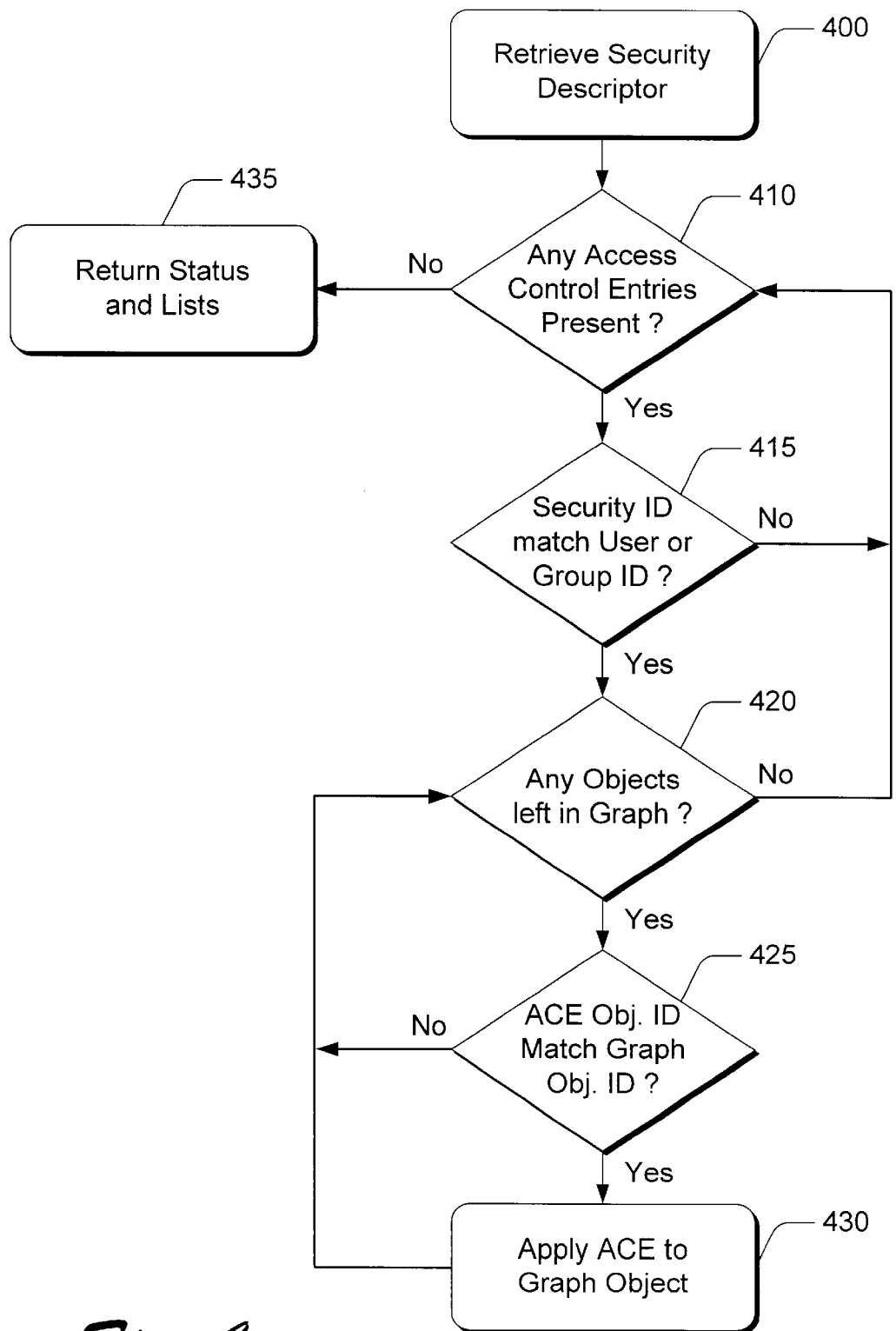
FIG. 4 shows a flowchart illustrating a method according to one embodiment of the invention.

In FIG. 4, a flowchart of a method according to one embodiment of the invention is shown. The method is invoked by a call to the "AccessCheckByType" function. The function call includes four parameters: an access token containing a USERID and a list of GROUPIDs that the user is member of, a security descriptor associated with an object, an object list defining a graph of objects and object sets associated with the object, and a desired access.

The method begins at 400, where the security descriptor is retrieved from the parameters supplied to the function. The access control list field is then examined. If the list is not present, then there are no access rights associated with the object, and access is granted. An access control list that is present, but contains zero entries is defined to deny access to the object to everyone but the owner. If there are entries in the access control list in the security descriptor, the method proceeds to 410, which is the top of a loop that iterates through each entry in the access control list.

At 410, a check is made to determine if there are any unprocessed access control entries left in the list, and if so, that entry is retrieved.

Next, at 415 a check is made to determine if the USERID or any of the GROUPIDs in the access token passed to the function matches the security identifier in the current access control entry. If the identifiers do not match, the method proceeds to 410, to get the next entry in the access control list.

If the security identifiers match, the method proceeds to 420, which is the top of a loop that iterates through each object in the object list. Here, a check is made to see if any objects remain in the list. If none remain, the method proceeds to 410 to get the next access control entry. Otherwise, the method proceeds to 425.

At 425 a check is made to determine if the current access control entry applies to the current object in the object list. The access control entry applies if the entry's object type identifier 356 matches the current object's type identifier passed to the method as part of the object graph. The identifiers in the access control entry and the graph object may identify either an object, or a set of objects. If there is a match, the method proceeds to 430. If not, the method proceeds to 420 to retrieve the next unexamined object in the list defining the object graph.

If the check at 425 determines the access control entry applies to the object, then at 435 the method examines the header field and bit mask field to set the access rights. The bit mask field is compared to the desired access parameter to determine if the access control entry contains any of the desired permissions. If it does, the header value determines whether the permission is granted or denied as well as whether the access control entry is effective or not. If it is granted, permissions bits present in the entry that match the desired permissions are added to a list of granted accesses Otherwise the permission bits are added to the denied accesses. The object type that matched is added to the second list. The two lists are returned to the caller of the function, along with an indication of the success or failure of the function as a whole.

The service provider module can use the returned list of granted object type lists and permissions to determine if the specific access requested by the application should be granted or not. For example, if the application is requesting to create a "user" object under an organization unit container in the directory service, the directory passes the security descriptor on the organizational unit, the desired access of "create child" and an object graph with the GUID for "organization unit" object type at the root, a GUID for "security principles" object type set at the next level, and a GUID of a "user" object type as the leaf. The access check function then returns two lists specifying if the "create child" is granted on each of the three object types. The directory service can then use this information to succeed the request if the access is granted on any object type or fail it if the access is not granted at any level.

Conclusion

A system to provide access control specific to a particular object type has been described. Although specific embodiments have been illustrated and described herein, it will be appreciated by those of ordinary skill in the art that any arrangement which is calculated to achieve the same purpose may be substituted for the specific embodiments shown. For example, in one embodiment, data fields defining certain aspects for the various data structures are replaced with alternative representations providing the same function. Additionally, new service modules are adapted to benefit from the advantages provided by the invention. As an example, a database engine is adapted in accordance with the invention to provide access control to individual columns of a database and to manage security roles in the database. This application is intended to cover any adaptations or variations of the present invention. Therefore, it is manifestly intended that this invention be limited only by the following claims and equivalents thereof.

We claim:

1. A computerized access control system comprising:
   an operating system operative to control an application and to control a service running on a computer, the service maintaining a service object corresponding to an object type supported by the service, and the service object having a link to an access control entry that includes an access right to perform an operation and an object identifier; and
   an access control module within the operating system, the access control module including an access control interface, and the access control module operative to grant or deny the access right to perform the operation on an object identified by the object identifier in the access control entry.

2. The system of claim 1, wherein the service is a file system service or a directory service.

3. The system of claim 1, wherein the operation is selected from the group consisting of create, delete or list contents.

4. The system of claim 1, wherein the operating system is a version of the Windows NT® operating system.

5. The system of claim 1, wherein the object identifier is a member of a set having common access control rights.

6. A method for controlling access by a software application to an object having a first object type identifier, the method comprising:
   determining a user identifier associated with the software application;
   retrieving an access control entry associated with the object, said access control entry having a second object type identifier, a security identifier, an access right definition, and an access right type; and
   comparing the first object type identifier to the second object type identifier and if the object type identifiers are equal, checking if the user identifier equals the security identifier and if so, providing the access right definition and the access right type to the software application.

7. The method of claim 6, wherein the access right definition defines the right to create an object, delete an object, or list the contents of an object.

8. The method of claim 6, wherein the access right type indicates whether access to the object is allowed or denied.

9. The method of claim 6, further comprising checking if the object is a member of a set of related objects.

10. The method of claim 6, further comprising retrieving a security descriptor containing an access control list that references the access control entry.

11. A computer comprising:
   a processor;
   a computer-readable medium;
   an operating system operative to control an application and a service running on the computer, the service maintaining a service object corresponding to an object type supported by the service, and the service object having a link to an access control entry that includes an access right to perform an operation and an object identifier; and
   an access control module within the operating system, the access control module including an access control interface, and the access control module operative to grant or deny the access right to perform the operation on an object identified by the object identifier in the access control entry.

12. The computer of claim 11, wherein the service is a file system service or a directory service.

13. The computer of claim 11, wherein the operation is create, delete or list contents.

14. The computer of claim 11, wherein the operating system is a version of the Windows NT® operating system.

15. The computer of claim 11, wherein the object is a member of a set having common access control rights.

16. A computer readable medium having computer-executable instructions for performing a method comprising:

determining a user identifier associated with a software application;

retrieving an access control entry associated with an object, the object having a first object type identifier, and the access control entry having a second object type identifier, a security identifier, an access right definition, and an access right type; and comparing the first object type identifier to the second object type identifier and if the object type identifiers are equal, checking if the user identifier equals the security identifier and if so, providing the access right definition and the access right type to the software application.

17. The medium of claim 16, wherein the access right definition defines at least one of create, delete, or lists the contents of the object.

18. The medium of claim 16, wherein the access right type indicates whether access to the object is allowed or denied.

19. The medium of claim 16, further comprising checking if the object is a member of a set of related objects.

20. The medium of claim 16, further comprising retrieving a security descriptor containing an access control list that references the access control entry.

* * * * *

UNITED STATES PATENT AND TRADEMARK OFFICE
CERTIFICATE OF CORRECTION

PATENT NO. : 6,625,603 B1
DATED : September 23, 2003
INVENTOR(S) : Garg et al.

It is certified that error appears in the above-identified patent and that said Letters Patent is hereby corrected as shown below:

Column 7,
Line 35, replace "requester" with -- requestor --.

Signed and Sealed this

Third Day of February, 2004

JON W. DUDAS
*Acting Director of the United States Patent and Trademark Office*